Figure 1:
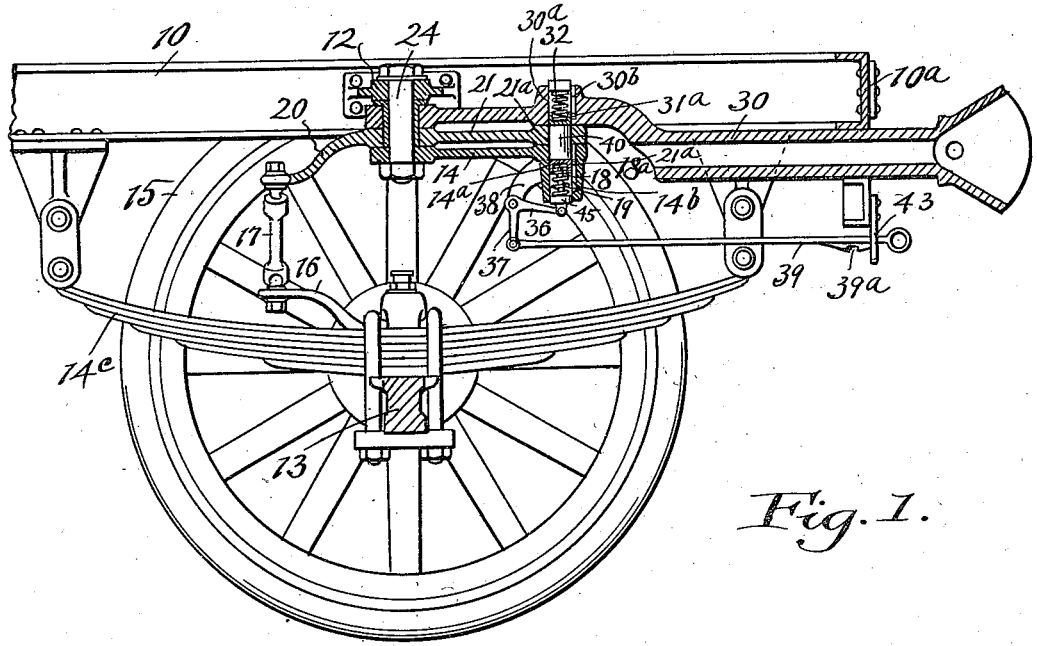

G. R. PENNINGTON.
TRAILER TRUCK.
APPLICATION FILED DEC. 18, 1915.

1,174,441.

Patented Mar. 7, 1916.

Inventor
Gordan R. Pennington
By Thurston & Kwis
attys.

UNITED STATES PATENT OFFICE.

GORDON R. PENNINGTON, OF CLEVELAND, OHIO.

TRAILER-TRUCK.

1,174,441.  Specification of Letters Patent.  Patented Mar. 7, 1916.

Application filed December 18, 1915.  Serial No. 67,520.

*To all whom it may concern:*

Be it known that I, GORDON R. PENNINGTON, a citizen of the United States, residing at Cleveland, in the county of Cuyahoga and State of Ohio, have invented a certain new and useful Improvement in Trailer-Trucks, of which the following is a full, clear, and exact description.

This invention relates to what are known as trailer-trucks, that is to say, commercial vehicles adapted for connection with a motor car by which it may be drawn forward,— or pushed backward, as the case may be.

Commonly at each end of a trailer truck is a steering axle of the well known construction commonly used on motor trucks, viz: an axle having at its end two knuckles pivoted thereto on vertical pivots, each knuckle carrying a spindle on which a steering wheel is mounted. These knuckles have arms which are connected together by a link bar; and one of them also has an arm which is connected by a link with a steering lever. Commonly, at each end of a trailer truck, there is a drawbar which is pivoted thereto on a vertical axis; and the steering lever, above referred to, is a rearward extension of, or is rigidly connected with said drawbar. Thus either end of the trailer may be connected by means of the drawbar with the motor car and thereby become the front end of the trailer. When the motor car which is pulling a trailer turns aside from the straight path, as when turning a corner, it will cause the drawbar to so turn upon its pivotal support that, as a result, the steering wheels of the truck will be turned to such position that the trailer will follow the motor car. Under these conditions the rear drawbar is located and fixed in the central position so that the wheels, which are then the rear wheels, will be locked in position such that they are parallel with each other and with the longitudinal axis of the vehicle. This construction is entirely satisfactory when the trailer is pulled along through the front drawbar. It frequently happens, however, that it is desired to back a trailer by pushing on the front draw-bar. Under this condition it is customary to lock the front draw-bar in its central position; and to then unlock the rear draw-bar, and to have a man turn it, and thereby the rear wheels, so that they become steering wheels and determine the path at which the trailer will travel when the pushing force is applied to the front draw-bar. Under these conditions it is desirable that the driver of the motor car shall so steer his vehicle that the point at which the draw-bar is connected therewith shall follow precisely the path which is determined by the position of the rear steering wheels of the trailer. It is, however, almost impossible to do this in practice. But if it is not done the front draw-bar, under the conditions stated will be subjected to great strains, which frequently bend or break it.

The object of this invention is to prevent this, and by means which do not add much to the cost of the trailer.

The invention consists in the construction and combination of parts shown in the drawings and hereinafter described and definitely pointed out in the appended claims.

Figure 2:
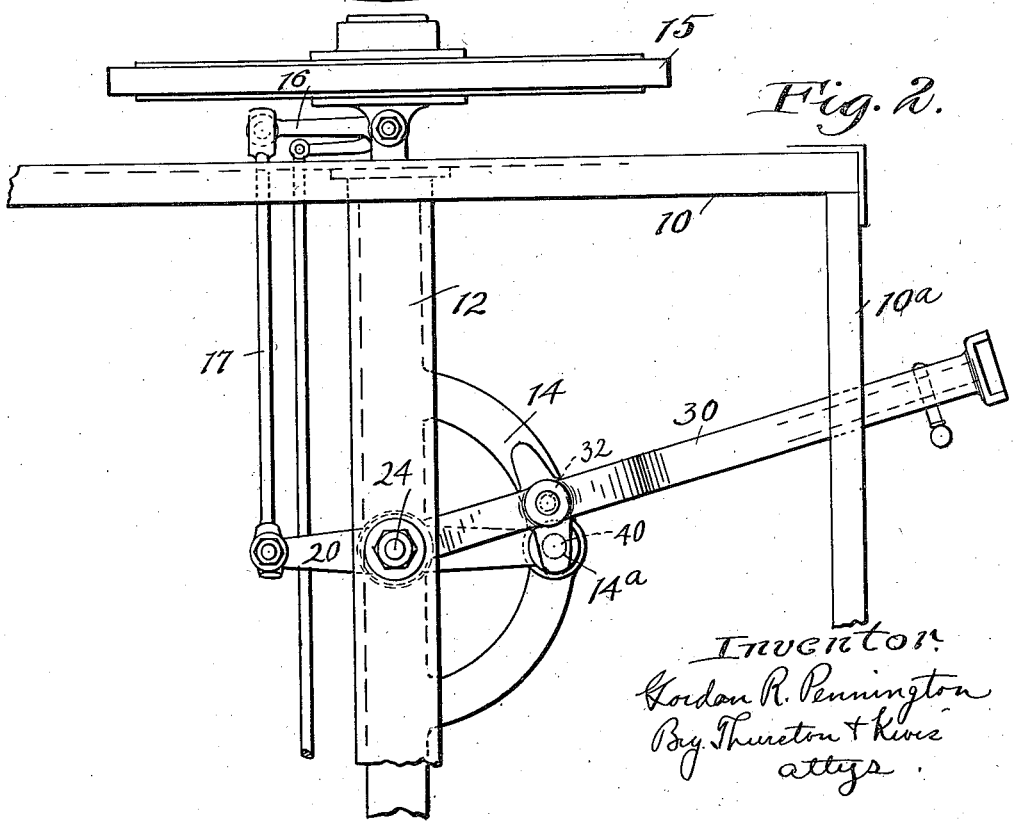

In the drawings, Figure 1 is a central sectional elevation of the front part of a trailer truck showing the present invention, and Fig. 2 is a plan view of the front end of said trailer truck.

Referring to the parts by reference characters, 10 represents the usual truck frame; and 12 a cross member rigidly secured thereto. The axle 13 is connected with the truck frame by springs 14 in the usual way; and the steering wheels 15 are connected with the axle in the usual way which it has not been thought necessary to show in detail. The steering lever 20 is pivoted to the cross member 12 by means of a vertical king bolt 24, and it has a forwardly extended arm 21 which lies above and slides upon a curved fifth wheel member 14, which is rigid with the cross member 12. The rear end of this lever is operatively connected with the steering wheels in the usual way, as for example, by a link 17 which is connected with an arm 16 of one of the steering knuckles.

30 represents the draw-bar which is pivoted at its rear end upon the same king bolt 24, and it extends forward from its pivot over and in contact with the upper surface of the front end of this steering lever 21, and thence through the front frame member 10ª.

The fifth wheel member 14, the front arm 21 of the steering lever, and the draw-bar 30 are formed with vertical holes 14ª, 21ª, and 30ª, which are in vertical alinement when the steering lever and the draw-bar are in their central positions. A locking pin 40 is fitted to these holes and may occupy a position such that it lies only in the holes in the draw-bar and steering lever, in which event it will connect these two together and compel them to move together, or it may occupy a position in the holes in the steering lever and of the fifth wheel, in which event it leaves the draw-bar free to turn about the king bolt, but locks the steering lever in its central position and prevents any such movement thereof as will permit or cause any deflection of the steering wheels. Means are provided by which this locking pin may be made to occupy at will either of these two operative positions. There may be, for example, in the hole 30ª a plunger 31 which is under the influence of a spring 32 pushing it downward, and consequently pushing the locking pin downward. This downward movement of this plunger 31 may be stopped when its lower end is flush with the under surface of the draw-bar, by means of a pin 31ª fixed to the plunger and projecting into a slot 30ᵇ in the hole of the draw-bar. There may be another plunger 18 movable vertically in the hole in the fifth wheel, and this may be under the influence of a spring 19 acting to move said plunger up. This upward movement may be stopped by the engagement of a pin 18ª fixed to the plunger 18 and engaging the end of a slot 14ᵇ in the hole 14ª. These two springs 32 and 19 may be of such relative strength that when allowed to so act the parts will be moved into the position shown in Fig. 1, that is to say, the locking pin 40 will lie wholly in the holes in the steering lever and fifth wheel, whereby as stated these two will be locked together and the draw-bar will be free to turn independently upon the king bolt. This is the condition the parts should be in when it is desired to back the trailer by force applied from the motor car to the front end of the draw-bar. The trailer may be steered by the usual mechanism provided for the purpose at its rear end, but the front draw-bar 30 will turn freely and will not be subjected to any bending or breaking strains as its front end follows the point on the motor car at which it is attached thereto.

To put the parts into the condition they should be in when the trailer is to be pulled by means of the draw-bar, one may employ the mechanism shown in the drawing; that is to say, there may be a bell crank lever 36 pivoted to a bracket 38 fixed to the fifth wheel. One arm of this bell crank lever may engage a plunger 45 which is movable in the hole 14ª in contact with the lower end of the spring 18. The vertical arm of the bell crank lever may be connected with the bar 39 having a notch 39ª near its front end. This bar may go through a slot in a bracket 43 fixed to the front end of the vehicle frame. By taking hold of the projecting front end of this bar pulling it forward and causing the notch 39ª to engage with the bracket plate 43, the plunger 45 may be pushed up, thereby so compressing the spring 19 that it will force upward the plunger 18, the pin 40, and the plunger 31. The locking pin 40 under these conditions will connect together the steering lever and the draw-bar, whereby any turning of the draw-bar will cause a corresponding proper turning of the steering lever.

The above described mechanism may be applied to both ends of the trailer truck if desired. Perhaps, however, the practical necessities will be sufficiently well complied with if this mechanism is applied to only one end of the trailer truck, or if at the other end there is the usual mechanism now in use.

It will be understood that the invention shown and described and hereinafter claimed is not limited to the precise embodiment thereof which the drawing shows, but may be varied considerably without departing from the invention, as defined by the claims.

Having described my invention, I claim:

1. In a trailer truck, the combination of a pair of steering wheels, a steering lever pivoted to the truck frame and operatively connected with said steering wheels, a draw-bar pivoted to said truck frame, and means for connecting together the steering lever and truck frame, or the steering lever and draw-bar, as desired.

2. In a trailer truck, the combination of a pair of steering wheels, a steering lever therefor pivoted on a vertical pivot to the truck frame and operatively connected with the steering wheels, a draw-bar pivoted to said truck frame, means whose positions may be changed when the steering lever and draw-bar are in their central positions, by which to connect together either the steering lever and draw-bar, or the steering lever and truck frame, as desired.

3. In a trailer truck, the combination of a pair of steering wheels, a steering lever therefor pivoted on a vertical pivot to the truck frame and operatively connected with the steering wheels, a draw-bar pivoted to said truck frame co-axially with said steering lever, a fifth wheel fixed to the truck frame,—said steering lever, draw-bar and fifth wheel having holes which will be alined when the steering lever and draw-bar are in their central positions, a locking pin which may lie wholly in the holes of the steering lever and draw-bar, or wholly in the holes of the draw-bar and fifth wheel as desired, and means for moving and holding said locking pin in either position.

4. In a trailer truck, the combination of a pair of steering wheels, a steering lever therefor pivoted on a vertical pivot between its ends to the truck frame and operatively connected at its rear end with the steering wheels, a draw-bar pivoted to said truck frame co-axially with said steering lever and extending forward over and in contact with the front extension of the steering lever, a fifth wheel rigid with the truck frame and extending under and in contact with the forward extension of the steering lever, and means for simultaneously disconnecting the steering lever from the fifth wheel and connecting it with the draw-bar, or for disconnecting it from the draw-bar and connecting it with the fifth wheel as desired.

In testimony whereof, I hereunto affix my signature in the presence of two witnesses.

GORDON R. PENNINGTON.

Witnesses:
   E. L. THURSTON,
   M. M. ROYAN.